Patented Dec. 28, 1937

2,103,778

UNITED STATES PATENT OFFICE 2,103,778

AZODYESTUFFS

Eugen Glietenberg and Friedrich Schubert, Leverkusen-I. G. Werk, Germany, assignors to General Aniline Works, Inc., New York, N. Y., a corporation of Delaware No Drawing. Application January 24, 1936, Serial No. 60,702. In Germany February 2, 1935

5 Claims. (Cl. 260—74)

The present invention relates to new azodyestuffs, more particularly it relates to dyestuffs which may be represented by the probable general formula:

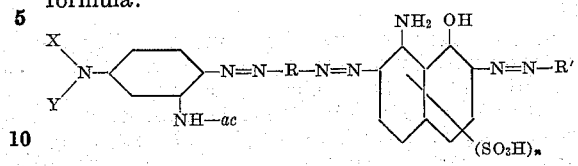

In this formula R represents a radical of the benzene or diphenyl series, R' means an aromatic radical, X and Y mean the same or different members selected from the group consisting of hydrogen, alkyl, aralkyl and aryl, which alkyl, aralkyl and aryl groups may bear substituents, ac means an acyl radical, and n stands for one of the numbers 1 and 2.

Those dyestuffs of the above identified formula, in which R stands for a radical of the diphenyl series, are obtainable by tetrazotizing one molecular proportion of a diaminodiphenyl compound, such as 4,4' - diaminodiphenyl, 4,4' - diaminodiphenyl-3,3' - dicarboxylic acid, 4,4' - diaminodiphenyl-2,2'-disulfonic acid, 4,4'-diaminodiphenyl-3,3'-dichlorodiphenyl, 4,4'-diaminodiphenyl-3,3'-dimethoxydiphenyl, and coupling in an acid medium with one molecular proportion of a peri-aminonaphthol sulfonic acid, after this in an alkaline medium with one molecular proportion of a monodiazo compound inclusive diazoazo compounds, and finally coupling with one molecular proportion of a m-phenylene diamine compound, in which one amino group is acylated by a carboxylic acid and in which the hydrogen atoms of the other amino group are wholly or partially substituted by alkyl, aralkyl or aryl groups, which alkyl, aralkyl or aryl groups may bear substituents.

Those dyestuffs of the above identified formula, in which R stands for a radical of the benzene series, are obtainable by diazotizing one molecular proportion of an amine of the benzene series, bearing a substituent convertible into an amino group, such as the acetyl amino group or the nitro group, coupling in an acid medium with one molecular proportion of a peri-aminonaphthol sulfonic acid, then in an alkaline medium with a monodiazo compound, transforming into the amino group the substituent convertible into the amino group, diazotizing and coupling with one molecular proportion of a m-phenylene diamine, in which one amino group is acylated in the manner referred to above and in which the hydrogen atoms of the other amino group are wholly or partially substituted by alkyl, aralkyl or aryl groups, which groups may bear substituents. We wish it to be understood that the terms alkyl, aralkyl or aryl in the claims include the substitution products thereof, such as hydroxyalkyl, chlorobenzyl, chlorophenyl, tolyl and the like.

The dystuffs thus obtained in general dye black to bluish black shades and are particularly adapted for dyeing cellulose fibers and leather. Especially in dyeing leather they show their technical importance in their having a sufficient fastness to acids for practical purposes and in their giving full shades of good covering power.

The invention is illustrated by the following examples, without being restricted thereto:

*Example 1.*—184 kgs. of benzidine are tetrazotized and combined in an acid medium with 363 kgs. of the sodium salt of 1,8-aminonaphthol-3,6-disulfonic acid. After the formation of the monoazodyestuff is complete, 209 kgs. of diazotized p-sulfanilic acid are added, and coupling is accomplished in a medium alkaline with sodium carbonate. After this coupling is finished, 206 kgs. of diethyl-m-aminoacetanilide dissolved in 276 litres of hydrochloric acid of 19.5° Bé. are added to the solution of the disazodyestuff. After stirring over night, the solution is heated to 80° C., common salt in a quantity of 18–20% of the volume is added, and the solution is neutralized with hydrochloric acid, until there is a weak acid reaction.

By this means the dyestuff is separated in an easily filtrable form. After separation by pressing and drying, the dyestuff forms a grey powder, which dissolves in water with a blackish violet and in pure sulfuric acid with a bluish violet coloration. The dyestuff having in its free state the following formula:

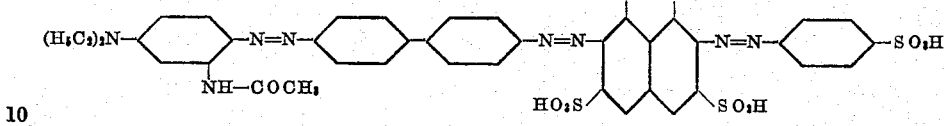

is especially adapted for dyeing calf-velours leather, and it is of particular technical interest, because it shows no decline in intensity even when reground.

On replacing the diazotized p-sulfanic acid by other monodiazo compounds, as for example those of o-, m- or p-aminobenzoic acid, 4-aminoazobenzene-4'-sulfonic acid, p-nitraniline and so on, or the diethyl-m-aminoacetanilide by 1-methyl-2-dimethylamino-4-acetylaminobenzene, dyestuffs of a similar shade and similar good properties are obtained.

When substituting in the above described dyestuffs the 1-amino-8-naphthol-3,6-disulfonic acid by the 1-amino-8-naphthol-4,6-disulfonic acid, dyestuffs exerting similar properties are obtained.

When substituting in the above described dyestuffs the benzidine by equivalent quantities of 3,3'-dichlorobenzidine or benzidine-3,3'-dicarboxylic acid, there are obtained dyestuffs exerting similar properties.

In an analogous manner as described in paragraph 1 the dyestuff from tetrazotized benzidine-2,2'-disulfonic-acid, 1-amino-8-naphthol-3,6-disulfonic acid, diazotized naphthionic acid or diazotized α-naphthylamine and diethyl-m-aminoacetanilide yields more bluish dyestuffs exerting otherwise similar properties.

*Example 2.*—Following the directions of Example 1, 184 kgs. of tetrazotized benzidine are first combined, in an acid medium, with 363 kgs. of 1,8-aminonaphthol-3,6-disulfonic acid (sodium salt), and then the monoazodyesuff obtained is coupled with 209 kgs. of diazotized p-sulfanilic acid in a medium alkaline with sodium carbonate. After this coupling is finished, 240 kgs. of m-benzoylamino-dimethylaniline, in hydrochloric acid solution, are added. The formation of the dyestuff is completed as described in Example 1. The dyestuff having in its free state the following formula:

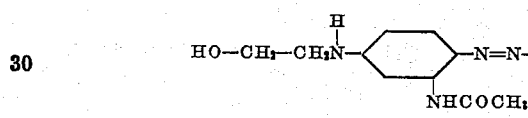

when dyed on calf-velours leather, shows, in comparison with that of Example 1, a bluer shade, but with the same good properties. These are likewise maintained, when the p-sulfanilic acid is replaced by other monodiazo compounds, as for example by those of o-, m- or p-aminobenzoic acid, p-nitraniline, aniline, aminoazobenzene sulfonic acids, and so on.

Of course, instead of the acid residues of the substituted m-phenylene diamines (acetyl- and benzoyl-residues), mentioned in Examples 1 and 2, also other residues, as for example oxalyl phthaloyl and other residues may be present.

*Example 3.*—The dyestuff produced in accordance with the directions of Example 1 by coupling 184 kgs. of tetrazotized benzidine in an acid medium, with 363 kgs. of 1,8-aminonaphthol-3,6-disulfonic acid sodium salt and then in a medium alkaline with sodium carbonate with 209 kgs. of p-sulfanilic acid, is, after this latter coupling is complete, coupled with 194 kgs. of monohydroxyethylamino-m-acetanilide. After stirring over night, this coupling is complete. The dyestuff obtained, having in its free state the following formula:

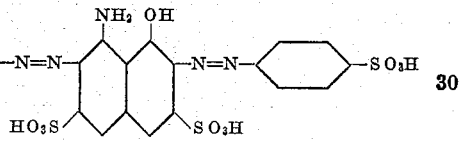

is of a somewhat greener shade and exhibits useful properties in the dyeing of leather.

Similar dyestuffs are obtained by replacing the p-sulfanilic acid by other suitable monoazo compounds, as described in Examples 1 and 2, or by substituting the acyl residue of the substituted m-phenylene diamine by other acyl residues, or finally, by replacing the mono-hydroxyethylamino group of the m-phenylenediamine derivative mentioned by dihydroxyalkylamino groups or by hydroxyalkylalkylamino groups. All these dyestuffs are distinguished in the dyeing of leather by the fineness of their shades and by their fastness properties.

*Example 4.*—138 kgs. of p-nitraniline are diazotized in the known manner and combined, in an acid medium, with 363 kgs. of the sodium salt of 1-amino-8-naphthol-3,6-disulfonic acid. When the coupling of the monoazo dyestuff is complete, 209 kgs. of diazotized p-sulfanilic acid are added, and coupling is effected in a medium alkaline with sodium carbonate. After coupling is complete, a solution of about 420 kgs. of sodium sulfide is added to the first solution, and the whole is stirred until the reduction is complete. This reduction mixture is now rendered acid to Congo red with hydrochloric acid, and the dyestuff thereby separated is squeezed off, and, for removing sulfur, redissolved in a hot aqueous solution of sodium carbonate and filtered. After cooling, a solution of about 70 kgs. of sodium nitrite is added to the filtrate, the filtrate is rendered acid to Congo red at a low temperature and stirred until diazotization is complete. Then a solution of 206 kgs.

of diethyl-m-amino acetanilide dissolved in 276 litres of hot hydrochloric acid is added. After stirring over night, about 15% by volume of common salt is added, the reaction mixture is neutralized with hydrochloric acid until there is a weak acid reaction and then the dyestuff is squeezed off. The dyestuff having in its free state the following formula:

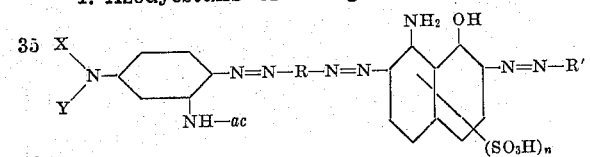

when dried, forms a grey powder, which dissolves in water with a blackish blue coloration.

We claim:

1. Azodyestuffs of the general formula:

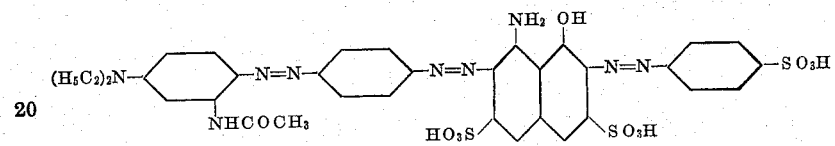

in which R represents a member selected from the group consisting of radicals of the benzene and diphenyl series, R' means an aromatic radical, X and Y mean members selected from the group consisting of hydrogen, alkyl, aralkyl and aryl, ac means an acyl radical, and n stands for one of the numbers 1 and 2, dyeing in general black to bluish black shades and being particularly adapted for dyeing cellulose fibers and leather.

2. Azodyestuffs of the general formula:

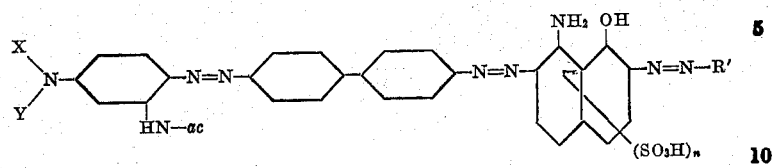

in which R' means an aromatic radical, X and Y mean members selected from the group consisting of hydrogen, alkyl, aralkyl and aryl, ac means an acyl radical, and n stands for one of the numbers 1 and 2, dyeing in general black to bluish shades and being particularly adapted for dyeing cellulose fibers and leather.

3. Azodyestuffs of the general formula:

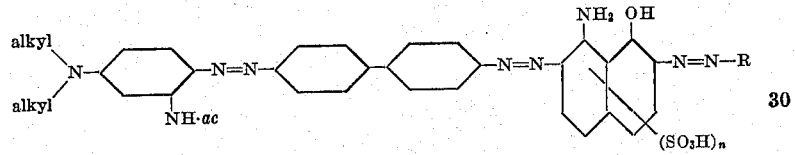

in which R stands for a radical of the benzene series, ac means an acyl radical and n for one of the numbers 1 and 2, dyeing in general black to bluish black shades and being particularly adapted for dyeing cellulose fibers and leather.

4. The dyestuff of the following formula:

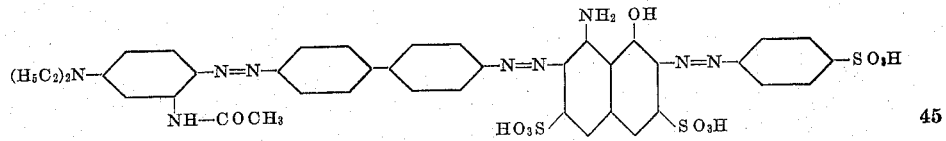

dissolving in water with a blackish violet and in pure sulfuric acid with a bluish violet coloration, being especially adapted for dyeing calf-velours leather.

5. The dyestuff of the general formula:

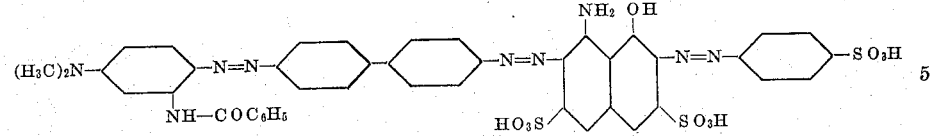

dyeing calf-velours leather bluish black shades.

EUGEN GLIETENBERG.
FRIEDRICH SCHUBERT.